Fig. 2  Fig. 3

Inventors
Charles P. Cardani
Joseph Harrington, Jr.
By their Attorney
Thomas J. Ryan.

Fig. 4

Inventors
Charles P. Cardani
Joseph Harrington, Jr.
By their Attorney
Thomas J. Ryan Inventors
Charles P. Cardani
Joseph Harrington, Jr.
By their Attorney
Thomas J. Ryan

*Inventors*
Charles P. Cardani
Joseph Harrington, Jr.
By their Attorney
Thomas J. Ryan United States Patent Office 2,791,772
Patented May 14, 1957

2,791,772
MACHINES FOR CUTTING, FORMING, AND APPLYING ELECTRICAL COMPONENTS AND THE LIKE

Charles P. Cardani, Hamilton, and Joseph Harrington, Jr., Wenham, Mass., assignors to United Shoe Machinery Corporation, Boston, Mass., a corporation of New Jersey Application June 14, 1954, Serial No. 436,458

7 Claims. (Cl. 1—2)

This invention relates to machines for cutting, forming and applying, one at a time, such fragile electrical elements as resistors, condensers, diodes, transistors and the like which have leads to be connected into circuits. The invention is herein illustrated as employed in a machine especially adapted to install resistors having substantially coaxial leads which are to be connected into a printed circuit on a plastic base. It is to be noted, however, that the invention is not limited in use to the processing of wired resistors, condensers or other electrical components whatever their size, but in several respects may also be useful in connection with the application and attachment of nonelectrical elongated articles or wireable things to various types of work pieces.

The electronics industry requires, in the assemblage of its wide variety of equipment, that huge quantities of different sorts of lead-bearing components be deftly and rapidly applied in their appropriate places and without disturbance to other portions of the work. The insertion of such components has until recently been largely, if not wholly, manual and therefore nonuniform, time-consuming, and costly. Regardless of the shape and function of the body of a component its leads ordinarily are of slender copper wire and are hence easily bent, this characteristic frequently making their manipulation only more complex. Moreover, since the manufacturers of such components normally provide them with standard lengths of leads, the lengths thus being intended to be more than sufficient to satisfy the requirements of particular applications, it usually is necessary first to sever the leads to effect a neat connection. When a component, a resistor, for example, is miniature in size (as large numbers of components usually are for purposes of printed wiring assemblies), its body may be cylindrical and have a length no greater than 3/8" and a diameter of the order of only 1/8", and consequently manual handling and connection of one small component after another within a limited space tends to become tedious and imprecise.

In view of the above it is an object of this invention, in one aspect, to provide a machine for receiving a plurality of similarly wired articles, such as electrical components in the form of miniature resistors, for example, and for effectively applying them one at a time in proper predetermined relation to a circuit or a work piece, for instance a circuit-supporting panel. Another and more specific object of the invention is to provide a powered machine for successively severing the leads of individual wire-ended components to appropriate length, forming the oppositely disposed and severed leads of each component to adapt them for application, and then inserting and securing the formed leads through prepunched holes in a printed circuit panel.

In accordance with these objects and as a feature of the invention the machine herein shown comprises, in combination, a compact head for receiving elongated components sidewise in succession, cutting, forming and inserting devices mounted in said head, means for operating said devices in predetermined sequence on only the flexible extremities of successive components, and work supporting means for holding a circuit panel in predetermined relation to said inserting devices to receive each component.

A further feature of the invention as herein illustrated resides more particularly in the provision of a fluid pressure operated machine for forming and fastening wire-ended components to prepunched printed circuit panels, said machine comprising means including an anvil for supporting a panel in predetermined position, means for releasably supporting a component in register with said anvil, means for severing the wire leads of said component to predetermined length while they are engaged by the component supporting means, means cooperating with said component supporting means to form the severed leads, and mechanism for thrusting the leads thus formed through holes in said positioned panel to clinch the leads on said anvil.

The above and other objects and features of the invention, together with various novel details and combinations of parts, will now be more fully described in connection with an illustrative machine in which the invention is embodied and with reference to the accompanying drawings thereof, in which.

Figure 1:
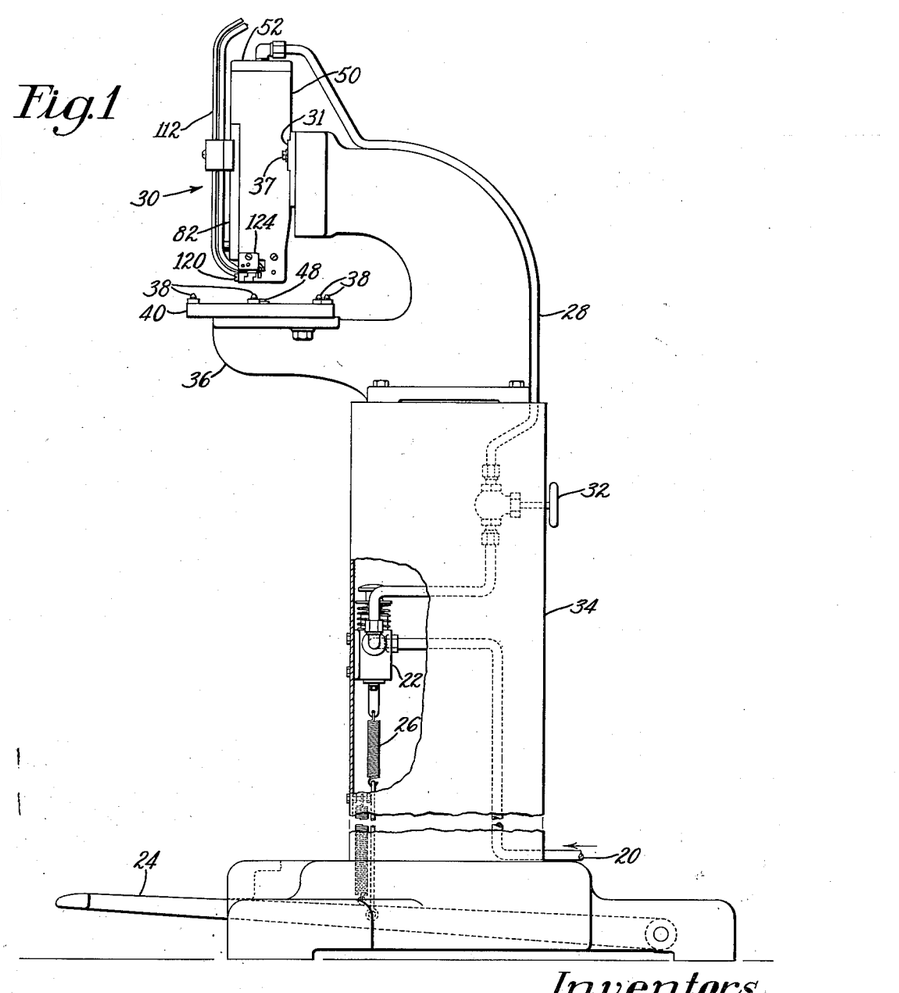
Fig. 1 is a view in side elevation, a portion of the frame being broken away, of a machine in which the invention is embodied and which is designed for cutting, forming and applying miniature wire-ended resistors and the like to printed circuits.
Figure 2:
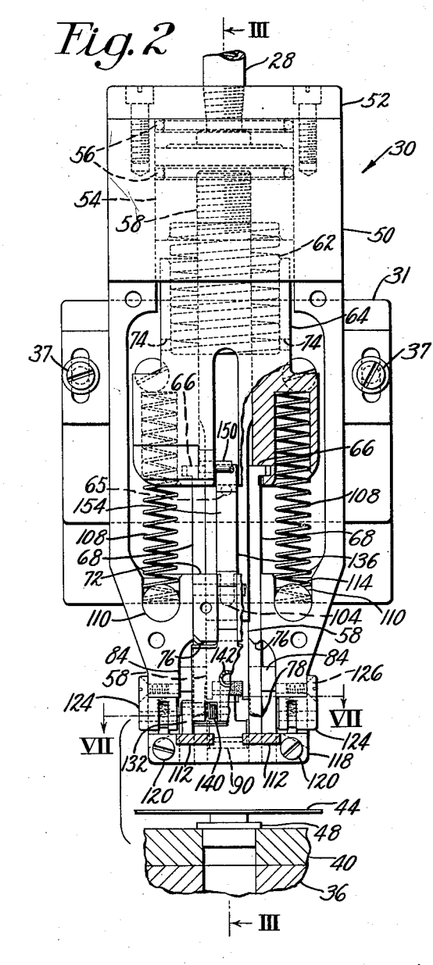
Fig. 2 is a view in front elevation of the machine head shown in Fig. 1 with a front cover plate removed, but on a larger scale, and partly in section, the parts being shown in starting position and portions being broken away to show details of construction.
Figure 3:
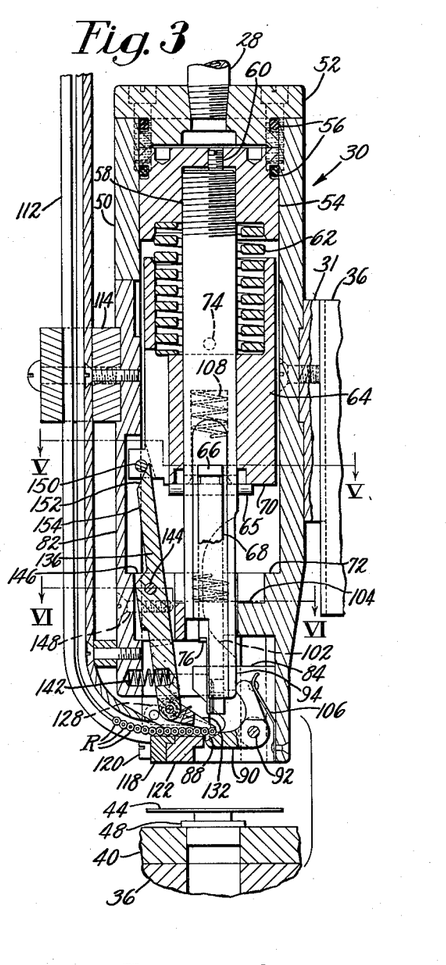
Fig. 3 is a vertical section taken on the line III—III in Fig. 2 and looking in the direction of the arrows, a few resistors being shown as loaded in the machine.
Figure 13:
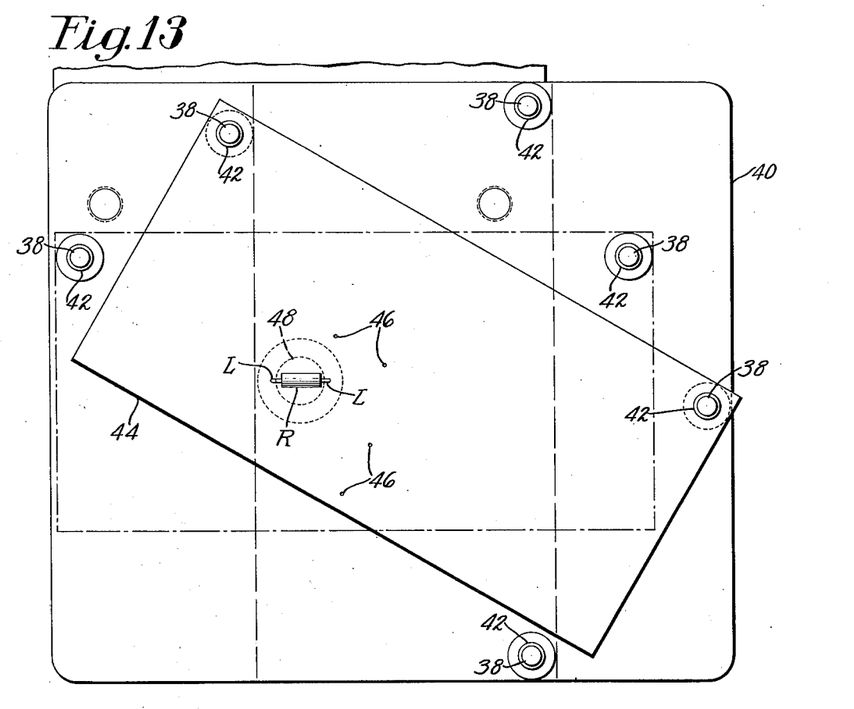
Fig. 13 is a plan view of the work supporting table shown in Fig. 1, a prepunched printed circuit base plate having received a resistor in predetermined position, and two other positions of the plate being indicated for the subsequent insertion by the machine of two more resistors.

The illustrative machine is actuated by compressed air which is supplied through a pipe 20 (Fig. 1) to a normally closed three-way slide valve 22 that is adapted to be controlled by means of a spring-suspended treadle 24. Upon depression of the treadle by an operator to open the valve 22 against the resistance of a return spring 26, pneumatic pressure is transmitted by a pipe 28 to the top of a demountable machine head generally designated 30 (Figs. 1, 2 and 3). A hand valve 32 in the pipe 28 conveniently enables an operator to adjust the force and speed with which operating parts in the machine head will be driven, as hereinafter to be described. A hollow standard 34 houses the valves 22 and 32 and provides pivotal support for one end of the treadle 24. An overhanging upper portion of a C-shaped casting 36 bolted on the standard 34 supports the head 30 by means of screws 37 (Fig. 2) extending through a vertically slotted adapter plate 31, the head thus being adjustably fixed heightwise and in predetermined relation to conical lugs 38 (Figs. 1, 13) on a horizontal work supporting table 40 secured to a lower portion of the casting 36. As best shown in Fig. 13, three pairs of these lugs are spaced to be received in prepunched locating holes 42, 42 of a base plate 44 carrying a printed or other type of circuit (not shown). Accordingly, the machine shown is adapted to apply a miniature resistor R (Figs. 3, 13, 14 and 15) to any or all of three different portions of a circuit located by the lugs 38, the opposed wire leads L being inserted endwise, by means to be described, in pairs of prepunched holes 46 suitably situated in the plate 44 with respect to the circuit. For supporting that portion of the plate which is to receive a resistor R an anvil 48 (Figs. 1, 2, 3, 13 and 14) is removably seated in a hole in the table 40 and is in proper register with the head 30.

Figure 4:
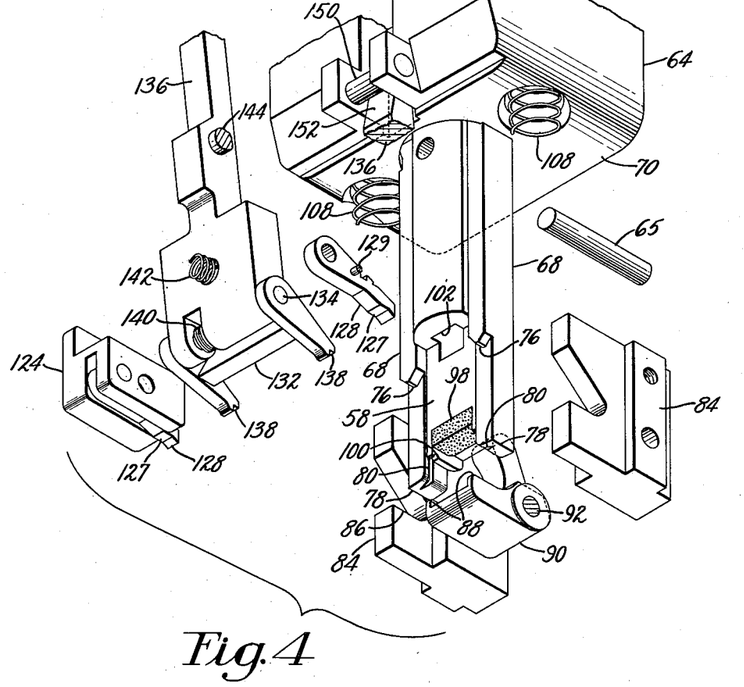
Fig. 4 is an exploded view in perspective, on a still larger scale, of operating parts shown in Figs. 2 and 3.
Figure 5:
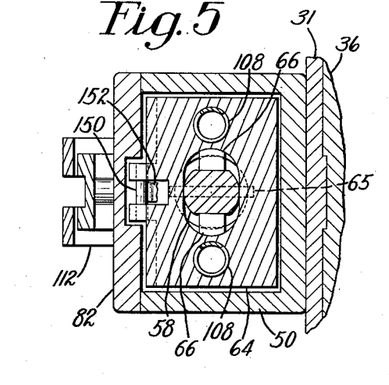
Fig. 5 is a section through the machine head taken on the broken line V—V of Fig. 3 and looking in the direction of the arrows.

Referring now to Figs. 2 and 3, the head 30 comprises a main body in the form of a rectangular casing 50 having a cap 52 screwed thereon which is adapted to receive the delivery end of the pipe 28. Air under fluid pressure may thus be transmitted to a chamber above a piston 54 vertically to actuate the latter therein. Packing rings 56, 56 are provided to avoid leakage. A piston rod 58 threaded into the piston 54 extends downwardly and has its lower end bifurcated to enable it to straddle, without contacting, the body of the resistor R to be operated upon and to engage inner portions of its wire leads. The rod thus serves as a driver bar as will be later explained and as it will hereinafter be termed. A setscrew 60 (Fig. 3) threaded through the top of the piston 54 engages the upper end of the piston rod or driver bar 58 and acts as a setting up adjustment in the machine, the screw 60 being off center to prevent relative turning movement. A normally extended and rather stiff compression spring 62 surrounding the driver bar 58 has an upper end engaging the piston 54 and a lower end seated within a recess formed in the upper portion of a member 64 (Figs. 2, 3, 4). The latter has its initial heightwise position determined by a pin 65 carried by and extending through the driver bar. For purposes of construction and another reason subsequently mentioned the member 64 has opposed retaining slots for receiving the inverted L-shaped heads 66, respectively, of a pair of depending, hardened outside former legs 68. When driven downwardly by the spring 62 the legs act on both lead wires L of a resistor R successively to shear them to proper length and to form them for insertion, and in addition, as will be described, afford means for swaging both leads of the next resistor R' in the machine to be applied to a circuit, the swaging occurring substantially at the limit of downward inserting movement of the driver bar 58. Each leg has an inner side vertically slidable in contact with a flat surface formed on the side of the driver bar, but throughout the major portion of the down stroke the driver bar 58 descends with the outside former legs 68, the latter being somewhat loosely guided in their downward movement by the internal walls of the casing 50 until a stop surface 70 (Fig. 4) of the member 64 abuts flat bottom portions 72 (Fig. 2) of the casing. Relief holes 74 (Figs. 2 and 3) formed in the member 64 permit air entrapped between the latter and the piston 54 to escape during the down stroke.

Figure 8:
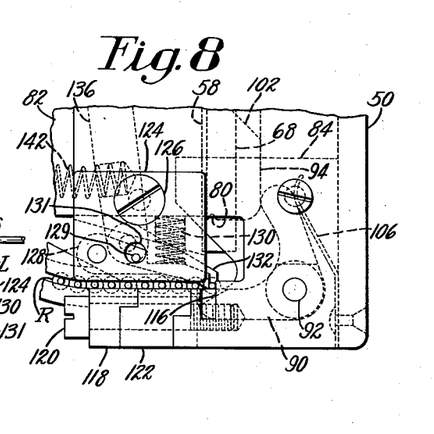
Fig. 8 is an enlarged view in side elevation of certain parts and resistors shown in Fig. 3.
Figure 9:
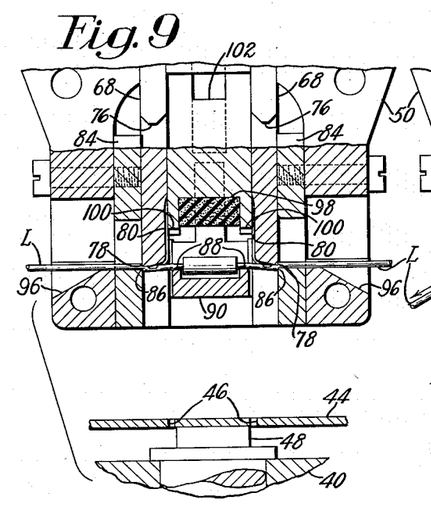
Figs. 9 through 11 are progressive step views, partially in section, illustrating the relative positions of parts operating on a resistor successively to cut its leads, form them, and insert them, Fig. 11 also indicating the simultaneous swaging of the resistor next to be inserted.
Figure 10:
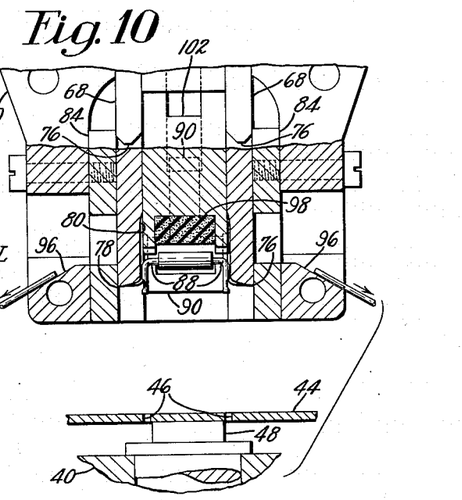
Figure 11:
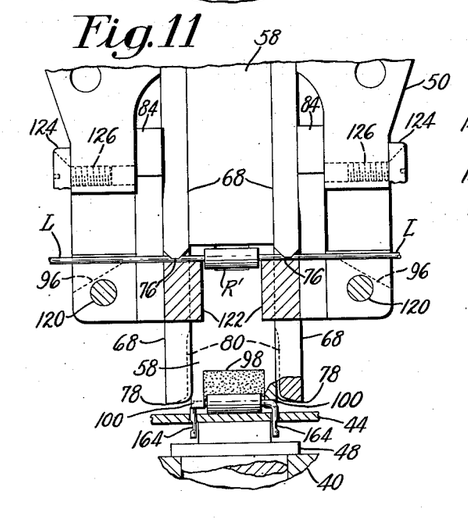
Figure 12:
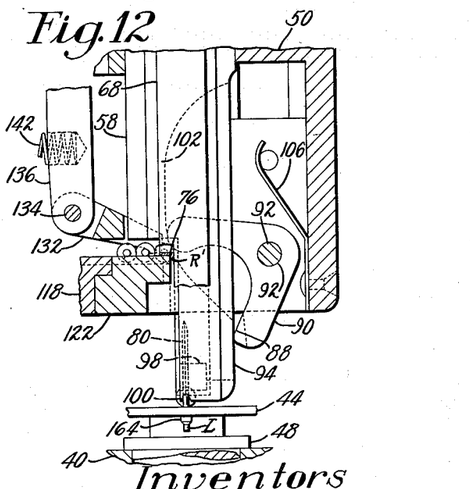
Fig. 12 is a side elevation, largely in section, of the parts shown in Fig. 11.

For working the leads as just described and as clearly shown in Figs. 9 through 12, both outside former legs 68 are provided with swages 76, shearing edges 78 offset rearwardly of the swages 76, and vertical forming grooves 80 which are arranged and adapted to accommodate and hold the severed wires. These lead forming devices are herein illustrated as being spaced equally from the ends of the body of the resistor R but it will be appreciated that they may, in other organizations embodying this invention, be advantageously located in different position relatively to a resistor or the like to be applied to a circuit and may, in fact, be located differently with respect to one another depending on the nature of a particular application. One reason for the way in which the head 30 is mounted in the present machine is to permit substitution of another head having parts appropriately designed for special applications and/or other shapes of components. A front cover plate 82, screwed onto the casing 50 may be removed to afford easy access to many of the operating parts and also to permit observation of their performance on test pieces of different types of work. For cooperating with the shearing edges 78 in the severing of the leads a pair of stationary plates 84, 84 (Figs. 3, 4, 8 and 9) respectively have a shearing blade 86, the plates being secured by screws in opposite sides of the lower end of the casing 50. During this shearing action, as well as during the subsequent lead forming, the body of the resistor R is disposed and suspended between spaced lead engaging portions 88 on the lower arm of an inside former 90 (Figs. 3, 4, 8, 9 and 10) that is pivotally mounted on a pin 92 affixed in the casing 50. This inside former is prevented from pivoting from its lead supporting position during shearing and forming by reason of the engagement, as shown in Fig. 3, of an end of its upper arm with a flat vertical portion 94 formed on the back of the lower end of the driver bar 58. Beveled surfaces 96 (Figs. 9 and 10) on the casing 50 assure that the severed end portions of the leads L will be removed and will not foul application of the resistor to the plate 44. After cutting and forming of the resistor, as shown in Figs. 9 and 10, and the member 64 having bottomed as above indicated, continued application of pneumatic pressure causes further downward movement of the driver bar 58 and compression of the spring 62. The lower end of the driver bar is recessed to receive a sponge rubber cushion 98 adapted to engage without impact or appreciable pressure the resistor body. It has been found that this cushion may safely be omitted when operating on many types of components, the important feature being that the lower end of the driver bar be sufficiently recessed to assure that no harmful stresses are directly applied to the bodies of the components. Notched end portions 100 of the bar engage the formed shoulders of the leads to push and advance them in the grooves 80 so that the extremities of the wires are guided and thrust from the head 30 and through the holes 46 as seen in Fig. 11. In this relative advance of the driver bar to apply the formed resistor the inside former 90 is released from its initial supporting position and permitted, largely by reason of its own weight and friction, to pivot counterclockwise (as seen in Fig. 3) from its position indicated in Figs. 3 and 8 to that shown in Fig. 12, an arcuate vertical cam slot 102 formed in the back of the driver bar being arranged to accommodate the upper arm of the inside former in order that its lower arm may be cleared from the path of the bar and the formed resistor. The lower limit of movement of the bar is determined by the lower end of the piston 54 engaging the upper end of the member 64.

A leaf spring 106 is secured to the inside rear wall of the casing 50 for the purpose of assuring that upon return of the driver bar to its initial raised position, the lower wall of the slot 102 now camming the inside former 90 clockwise as seen in Fig. 3, the upper arm of the inside former 90 will be retained in contact with the flat portion 94 and hence the inside former portions 88 will be in proper position to support the next resistor to be formed and inserted. It should be noted, incidentally, that these spaced wire supporting portions 88 (Figs. 4 and 9) are raised sufficiently from the extremity of the lower arm of the inside former to accommodate different thicknesses of resistor bodies; in the case of most half-watt miniature resistors presently used, this means an allowance for body diameters of up to about .166". For effecting the return stroke of the driver bar and other operating parts to their initial positions a pair of compression springs 108, 108 (Fig. 2) have their upper ends nested in the member 64, and lower ends respectively engaging flat portions of pins 110, 110 that extend in milled recesses formed within the casing 50. Thus, having been energized during the down stroke of the cutting, forming, and inserting devices by reason of treadle operation of the conventional three-way slide valve 22 to apply operating pressure, the springs 108 return the operating parts in readiness to apply the next resistor upon release of the treadle 24. It will be understood that the spring return of the released treadle closes the air supply port in the valve 22 and permits compressed air to exhaust from the casing 50.

Figure 6:
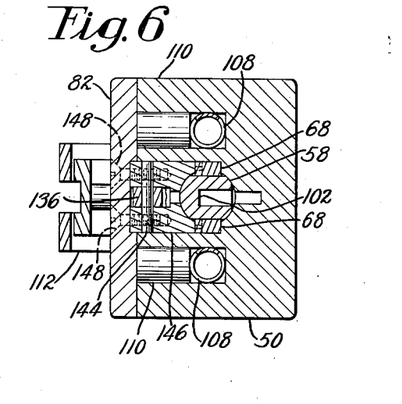
Fig. 6 is a section taken on the broken line VI—VI of Fig. 3 and looking in the direction of the arrows.
Figure 7:
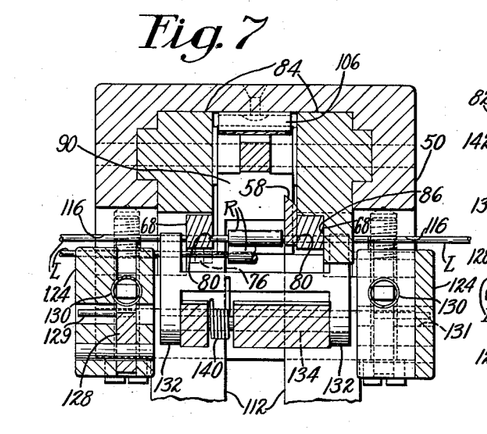
Fig. 7 is a section taken on the broken line VII—VII in Fig. 2, the parts shown being to an increased scale and indicating diagrammatically the location of one of two swaging tools with respect to a resistor.

Resistors may be supplied sidewise, i. e. transversely of themselves, to the machine by any convenient means or by hand. In the illustrative machine a stationary raceway or delivery chute 112 is affixed by means of a bracket 114 to the front of the head cover plate 82, and is provided with a track adapted to accommodate a large number of resistor bodies in a row in side by side relation as indicated in Figs. 3 and 8. An agitated hopper, or other suitable means (not shown) may be employed to assure that the raceway is kept supplied. The resistors are urged forwardly by gravity and feeding means about to be described, until the leads of the endmost one to be formed engage vertical abutment shoulders 116 (one only shown in Fig. 8) formed on the casing 50 which are arranged to position that resistor in register with the shearing edges 78, the forming grooves 80 and the driver bar notches 100. A cross bar 118 (Figs. 3 and 8) constituting the lower end of the raceway, is secured to the head 30 by screws 120 that also extend through a hardened swaging block 122 which is thus fixedly mounted on the casing 50 for cooperation with the swages 76. For controlling passage of the resistors one by one from the delivery end of the raceway to the swaging zone and then to the cutting and forming zone, a pawl-supporting block 124 (Figs. 4, 8 and 11) is secured by a screw 126 to each of the opposite sides of the casing 50, the flat bottom of each block 124 serving to confine the lower leads L in spaced relation on the cross bar 118 and on the swaging block 122. A retaining pawl 128 (Figs. 4, 7 and 8) pivotally mounted on a pin in each block 124 is urged downward on a lead by a compression spring 130, a flat 127 (Fig. 4) on the pawl 128 thus yieldingly holding the next-to-the endmost resistor in register with the swages 76. Accurate location of the leads on the swaging block for swaging is unnecessary, and the provision of the flat 127 enables different body sizes to be fed the proper distance from their retained position to the forming zone by mechanism about to be described. Ends of the spring 130 respectively engage a flat lower surface of the casing 50 and a horizontal shoulder on the retaining pawl 128. A pin 129 (Figs. 4, 7 and 8) projecting from each pawl 128 extends into a hole 131 in the block 124, the walls of the hole thus limiting the extent of pivotal movement of the pawl. For acting on a resistor after its leads have been swaged in order positively to feed it from a retained or next-to-endmost position into endmost position for severing and forming a two-armed feeding pawl 132 is pivotally supported by a pin 134 extending through the lower end of an upright cam lever 136, the pawl 132 having a pair of spaced notches 138 (Fig. 4) adapted to act respectively on the front "side" of each of the leads adjacent to the resistor bodies. This feeding pawl is urged downwardly by a coil spring 140 (Figs. 4 and 7) on the pin 134 to assure that during counterclockwise movement (as seen in Fig. 3) of the lower end of the lever 136 to the notches 138 will force the oppositely extending leads of the endmost resistor rearwardly for contact with the shoulders 116 as effected by a compression spring 142 (Figs. 3 and 4). This spring has its ends fitted into oppositely disposed slots formed in the lever 136 and the cover plate 82. The lever 136 is fulcrumed on a pin 144 which is supported by a block 146 (Figs. 3 and 6) held by screws 148 extending through the cover plate 82. The rearward wall of the block 146 serves to guide the driver bar 58 vertically. For actuating the cam lever 136 to feed resistors properly in time relation to the operating cycle of the machine, a pin 150 (Figs. 3 and 4) carried by lugs on the member 64 is arranged to be engaged by the beveled upper end 152 of the lever. Accordingly in the first portion of the down stroke of a cycle the descending pin 150 causes clockwise movement of the lever 136 about the pin 144 (as seen in Fig. 3), the feeding pawl 132 thus being retracted from the operating paths of the driver bar and the cutting and forming devices. In this retraction the pawl 132 yields counterclockwise as seen in Fig. 3 to withdraw over the next-to-endmost resistor's leads, the rearward extremity of the pawl 128 maintaining the endmost resistor's leads in contact with the abutment shoulders 116. A front vertical portion 154 of the lever is also engaged by the pin 150 during downward movement of the latter, and the feeding pawl 132 is thereby held retracted in an idle position during the forming and inserting operations, but is ready to advance the next resistor when it has been swaged and the pin 150 has again moved heightwise in contact with the lever end 152.

Figure 14:
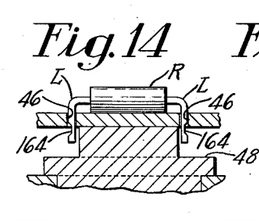
Figs. 14 and 15 are views in front and side elevation respectively of a resistor after insertion by the machine as fitted with an anvil having no engagement with the leads.
Figures 15, 16:
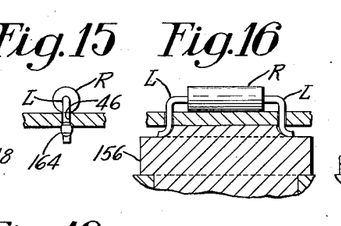
Figs. 16 through 19 respectively illustrate resistors having their leads formed and secured to base plates by means including detachable anvils designed to provide clenching in different ways.
Figure 17:
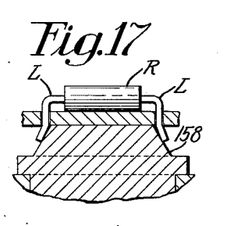
Figure 18:
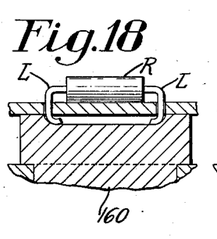
Figure 19:
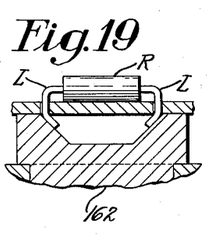

The operating cycle of the machine will now be briefly reviewed, it first being noted that with minor modification the illustrated machine may apply resistors or the like in the ways indicated in Figs. 16 to 19 inclusive in lieu of the described mode shown in Figs. 14 and 15. This is to say that different anvils (156, 158, 160 and 162, for example) appropriate to the particular inward or outward clinching desired may be used; also the lead swaging may be omitted, if desired, by simply substituting other outside former legs 68 which are not provided with swages 76. Swaging of the leads produces flattened lead portions 164 (Figs. 12 and 15) that have a width slightly greater than the pre-punched holes 46 to afford mechanical holding power and a connection that is readily solderable. In general, clinching of the leads is preferred to swaging since better mechanical holding power is normally thereby achieved, and further there results a greater possibility of obtaining a metal to metal contact when clinching.

Assuming the plate 44 to have been located on the proper pair of lugs 38 so that the anvil 48, for example, is beneath that pair of holes 46 to receive a resistor, and that the head 30 and the raceway 112 are loaded with resistors as above described and shown in Fig. 3, an operator depresses the treadle 24 to install the endmost resistor as shown in Figs. 13 and 14, and releases the treadle to restore the parts to initial position. The first of a series of resistors applied to the circuit plate will not have been swaged, of course, if it was not previously held by the retaining pawls 138 in register with the swages 76, but in each subsequent cycle of the machine the next-to-endmost resistor has its leads swaged as shown in Fig. 11, while the driver bar 58 is completing insertion of an endmost resistor. In sequence in a cycle, therefore, the endmost resistor, which has been automatically fed into position to be further operated upon by means of the spring 142 acting through the lever 136 and the pawl 132, has its leads cut by the shearing edges 78 of the legs 68 cooperating with the blades 86 (Fig. 9), is then formed by the continued downward movement of the outside former legs 68 relatively to the then stationary inside former 90 (Fig. 10) and is thereafter moved downwardly onto the plate 44 by the relative advance of the driver bar 58 (Fig. 11). The cam slot 102 is positioned heightwise in that bar to release the inside former 90 for pivotal movement at the proper instant after the leads have been formed, and at the correct time in the return upward stroke of the bar 58 the lower wall of the cam slot 102 engages the upper extremity of the inside former to position its lower portion for reception of another endmost resistor on the portions 88.

From the foregoing description it will be apparent that this invention provides an easily operated, compact machine for securing elongated articles or applying wired components rapidly and effectively, their body portions being safeguarded from impact or harmful contacts throughout the process.

Having described our invention, what we claim as new and desire to secure by Letters Patent of the United States is:

1. A fluid pressure operated machine for applying discrete lead bearing components to wiring boards comprising means for supporting a wiring board having lead receiving holes, a casing adjustably spaced heightwise from said means, a pressure operated device reciprocable in said casing to thrust the leads of a component from the casing, toward said supporting means, and through said holes and then be retracted, said device being constructed to bear exclusively on the leads of a component while accommodating its body, means mounted in the casing movable adjacent to said device and having operative connection therewith for cutting and forming the leads of a component before it is acted on by said device, the limits of movement of said device and forming means being determined by said casing, and means mounted externally of said casing for controlling the application of operating pressure to said device.

2. A fluid pressure operated machine for attaching oppositely extending leads of a component to a wiring board comprising a machine head, anvil means spaced heightwise of the head for supporting the wiring board in predetermined position with respect to said head, U-shaped means pivotally related to the machine head for releasably supporting a component in said head by engagement exclusively with the oppositely extending leads, means operable heightwise in said head for acting on said leads outwardly from said releasable lead supporting means and with respect to the body of the supported component to form them for insertion through preformed holes in the supported wiring board, and a fluid pressure actuated driver bar mounted in said head for relative reciprocable movement heightwise for thrusting the formed leads from the machine head, through said holes, and against said anvil means, said driver bar having an end surface recessed to complement said U-shaped means to accommodate the body of the component and having another surface disposed for controlling the release of the component from said component supporting means.

3. In a machine for applying lead bearing components to work pieces, an anvil, a casing spaced heightwise from the anvil and constructed to receive a plurality of components one by one in side by side relation, a reciprocable driver bar in said casing and guided thereby for movement along a predetermined path relatively to the anvil, cutting and forming means operable in the casing on an endmost component in register with the anvil to guide the leads in parallel relation with the operating path of said driver bar, and feeding means operatively connected to said cutting and forming means for controlling the passage of said components sidewise into the casing, said feeding means including a feeding pawl having an end positioned to engage an endmost component to urge it into position to be operated upon by said forming means and a retaining pawl mounted in the casing for maintaining the endmost component in register with said forming means during retraction of said feeding pawl from that component.

4. A machine for inserting lead bearing resistors or the like in a printed circuit comprising means including a removable forming anvil for supporting a panel carrying the circuit, the panel having preformed holes for receiving the leads of a resistor endwise and said anvil being positioned to abut the panel between said holes, a machine head disposed on the opposite side of the panel from the anvil and in register therewith, said head having a passageway in its side constructed to receive a plurality of resistors sidewise, one at a time in a row, means mounted in said head and movable adjacent to the passageway for the cutting and bending the leads of an endmost resistor in the row so that each cut lead has an unbent portion which projects from its body in one direction and has a portion bent to extend angularly in another direction, and a driver bar mounted for movement in and out of said head by a predetermined amount and in time relation with said cutting and bending means to place the body of said endmost resistor adjacent to the supported panel while thrusting the cut and formed leads through said holes and against the forming surface of said anvil, said driver bar having a lead engaging end shaped to accommodate the resistor body while engaging said unbent cut lead portions.

5. A machine for assembling electrical components with wiring boards, each of said components consisting of a fragile cylindrical body portion having coaxial leads extending therefrom, said machine comprising a frame, an anvil mounted on said frame for supporting a wiring board with its preformed holes in predetermined position, a machine head secured to the frame heightwise of the anvil and providing an enclosed lead cutting and forming zone in register with said anvil, a raceway associated with said head having a channel portion to accommodate a series of said fragile component bodies and guide them into the head, movable means adjacent to the delivery end of said raceway and engageable with the leads of successive endmost components for positioning them in the cutting and forming zone, an inside former movably mounted in said head for cooperation with said movable means and having a recessed portion engageable with the portions of the leads of a positioned component which are adjacent to its fragile body portion, a reciprocable outside former in said head having a lead engaging end guided thereby for heightwise movement toward and from said anvil, said lead engaging end of the outside former being shaped to accommodate a positioned component body portion and cooperate with the recessed portion of said inside former in bending terminal portions of the leads spaced from said body portion, and a reciprocable driver bar mounted in said head for heightwise movement in time relation to said outside former over a path extending nearly to the supported wiring board, said driver bar having a lead engaging end shaped to bear only on the unbent portions of the leads adjacent to the fragile body portion to thrust said terminal portions endwise through the wiring board holes and into clinching engagement with said anvil.

6. A machine for applying lead bearing components to wiring boards comprising means for supporting a wiring board having preformed holes for receiving the respective leads endwise, a casing mounted above said means and having a stop formed thereon, means associated with the casing for supplying a plurality of said components, one by one, in side by side relation to said casing, a reciprocable driver bar mounted in the casing and limited in heightwise driving movement by said stop, said driver bar having an end formed to straddle and avoid engaging the body of the endmost component in advancing heightwise beyond the casing to thrust the leads endwise through the holes in the supported wiring board, cutting and forming devices mounted in said casing for acting initially on the leads of successive endmost components to prepare them for insertion, said cutting and forming devices being guided and limited by the casing in their heightwise movement to cooperate with the driver bar in directing the prepared leads a predetermined amount beyond the wiring board holes, and swaging devices formed on said cutting and forming devices, the swaging devices being positioned to operate on the leads of a next-to-endmost component.

7. A machine for installing axial lead bearing components on wiring boards comprising anvil means for supporting a wiring board, a casing mounted above said anvil-supporting means, a reciprocable lead cutting-forming means arranged in said casing, a reciprocable driver bar mounted in the casing and constructed to bear exclusively on the unbent lead portions of a component adjacent to its body while accommodating the latter, power operated means for moving the cutting-forming means and said driver bar in sequence to project the component body from the casing for installation in juxtaposition to a wiring board surface with portions of the leads bent and extending therethrough, and stop means mounted in said casing for determining the limit of movement of the driver bar toward said supporting means whereby the component body and its adjacent unbent lead portions are predeterminedly located above said wiring board surface.

References Cited in the file of this patent
UNITED STATES PATENTS

| | | |
|---|---|---|
| 351,361 | Coupal et al. | Oct. 26, 1886 |
| 359,631 | Prentice | Mar. 22, 1887 |
| 432,375 | Coleman | July 15, 1890 |
| 552,869 | Elliott | Jan. 7, 1896 |
| 1,294,882 | Dilks | Feb. 18, 1919 |
| 2,280,665 | Schmitter | Apr. 21, 1942 |
| 2,281,478 | Chirelstein | Apr. 28, 1942 |
| 2,420,660 | Falter | May 20, 1947 |
| 2,482,993 | Walker | Sept. 27, 1949 |
| 2,617,098 | Lenart | Nov. 11, 1952 |